(12) United States Patent
Suzuki et al.

(10) Patent No.: US 9,195,016 B2
(45) Date of Patent: Nov. 24, 2015

(54) OPTICAL CONNECTOR

(75) Inventors: Hitoshi Suzuki, Yokohama (JP); Takeshi Kobayashi, Yokohama (JP); Kiyoshi Iwamoto, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 17 days.

(21) Appl. No.: 14/116,989

(22) PCT Filed: Apr. 2, 2012

(86) PCT No.: PCT/JP2012/058986
§ 371 (c)(1),
(2), (4) Date: Jan. 14, 2014

(87) PCT Pub. No.: WO2012/160878
PCT Pub. Date: Nov. 29, 2012

(65) Prior Publication Data
US 2014/0126864 A1 May 8, 2014

(30) Foreign Application Priority Data

May 26, 2011 (JP) ................................ 2011-117961
Sep. 20, 2011 (JP) ................................ 2011-205289

(51) Int. Cl.
*G02B 6/42* (2006.01)
*G02B 6/38* (2006.01)

(52) U.S. Cl.
CPC ............ *G02B 6/4204* (2013.01); *G02B 6/4292* (2013.01); *G02B 6/3853* (2013.01); *G02B 6/3879* (2013.01); *G02B 6/4214* (2013.01)

(58) Field of Classification Search
CPC .. G02B 6/3801; G02B 6/3833; G02B 6/3855; G02B 6/3857; G02B 6/3898; G02B 23/2476; G02B 6/325; G02B 6/327; G02B 6/3853; G02B 6/3879; G02B 6/4204; G02B 6/4214; G02B 6/4292; G02B 7/021; H01R 43/0424; H01M 2/18
USPC ..................................................... 385/35, 93
See application file for complete search history.

(56) References Cited

U.S. PATENT DOCUMENTS 4,447,121 A * 5/1984 Cooper et al. .................. 385/87
4,632,505 A 12/1986 Allsworth
(Continued)

FOREIGN PATENT DOCUMENTS

EP 0159198 A2 10/1985
JP 54-041249 U 3/1979
(Continued)

OTHER PUBLICATIONS

Japanese Office Action dated May 28, 2013, issued in corresponding Japanese Patent Application No. 2011-205289.
(Continued)

*Primary Examiner* — Peter Radkowski
(74) *Attorney, Agent, or Firm* — Westerman, Hattori, Daniels & Adrian, LLP

(57) ABSTRACT

An optical connector has: a holding member having an accommodating portion formed at an end thereof for accommodating a collimator lens and an insertion hole formed at an opposite end thereof for inserting an optical fiber; and a resin joint having a first insertion hole formed at an end thereof for inserting the holding member and a second insertion hole formed at an opposite end thereof for inserting the optical fiber. The collimator lens and the optical fiber are positioned by making at least one of the collimator lens and an end surface of the optical fiber abut against a recess formed in the holding member near the accommodating portion. The resin joint has a fixing portion formed therein for fixing a part of the optical fiber positioned in the holding member inserted via the first insertion hole into the resin joint, the part being exposed from the holding member.

15 Claims, 16 Drawing Sheets

(56) References Cited

U.S. PATENT DOCUMENTS

| | | | | |
|---|---|---|---|---|
| 4,695,124 | A | * | 9/1987 | Himono et al. ............... 385/78 |
| 4,733,094 | A | * | 3/1988 | Carpentier et al. ........... 250/551 |
| 4,741,590 | A | * | 5/1988 | Caron ............................ 385/60 |
| 5,023,447 | A | * | 6/1991 | Masuko et al. ........... 250/227.24 |
| 5,293,438 | A | * | 3/1994 | Konno et al. ................... 385/35 |
| 5,684,903 | A | * | 11/1997 | Kyomasu et al. ............... 385/93 |
| 6,071,016 | A | * | 6/2000 | Ichino et al. .................... 385/92 |
| 6,334,716 | B1 | * | 1/2002 | Ojima et al. .................... 385/89 |
| 6,718,090 | B2 | * | 4/2004 | Jang et al. ....................... 385/34 |
| 6,939,058 | B2 | * | 9/2005 | Gurevich et al. ............... 385/93 |
| 7,377,698 | B2 | * | 5/2008 | Asada ............................. 385/62 |
| 7,474,822 | B2 | * | 1/2009 | Kobayashi et al. ............. 385/35 |
| 2002/0131703 | A1 | * | 9/2002 | Velikov ........................... 385/35 |
| 2002/0181865 | A1 | * | 12/2002 | Jang et al. ....................... 385/34 |
| 2003/0007743 | A1 | * | 1/2003 | Asada ............................. 385/81 |
| 2003/0152336 | A1 | * | 8/2003 | Gurevich et al. ............... 385/88 |
| 2004/0052476 | A1 | * | 3/2004 | Houmault ....................... 385/88 |
| 2004/0242965 | A1 | | 12/2004 | Forkey et al. |
| 2005/0213893 | A1 | * | 9/2005 | Hamasaki et al. .............. 385/80 |
| 2006/0034571 | A1 | * | 2/2006 | Nagano et al. .................. 385/94 |
| 2007/0147747 | A1 | * | 6/2007 | Inujima et al. .................. 385/92 |
| 2007/0211999 | A1 | * | 9/2007 | Kobayashi et al. ............. 385/79 |
| 2007/0292083 | A1 | * | 12/2007 | Nielson et al. .................. 385/74 |
| 2008/0080812 | A1 | * | 4/2008 | Kobayashi et al. ............. 385/35 |
| 2010/0029113 | A1 | * | 2/2010 | Smith et al. ................... 439/271 |

FOREIGN PATENT DOCUMENTS

| | | | | |
|---|---|---|---|---|
| JP | 58-047803 | U | 3/1983 | |
| JP | 59-095308 | U | 6/1984 | |
| JP | 60-097310 | U | 5/1985 | |
| JP | 60-140304 | A | 7/1985 | |
| JP | 61-099112 | A | 5/1986 | |
| JP | 02-010504 | U | 1/1990 | |
| JP | 05-011137 | A | 1/1993 | |
| JP | 05-020009 | U | 3/1993 | |
| JP | 06-160668 | A | 6/1994 | |
| JP | 07-120642 | A | 5/1995 | |
| JP | 09096743 | A * | 4/1997 | ............... G02B 6/42 |
| JP | 09-159867 | A | 6/1997 | |
| JP | 10-160992 | A | 6/1998 | |
| JP | 11-305066 | A | 11/1999 | |
| JP | 2003-270487 | A | 9/2003 | |
| JP | 2004020895 | A * | 1/2004 | ............... G02B 6/38 |
| JP | 2005-070568 | A | 3/2005 | |
| JP | 2006-521585 | A | 9/2006 | |
| JP | 2007-241094 | A | 9/2007 | |
| WO | 2011/129229 | A1 | 10/2011 | |

OTHER PUBLICATIONS

International Search Report of PCT/JP2012/058986, mailing date of Jun. 26, 2012.

* cited by examiner

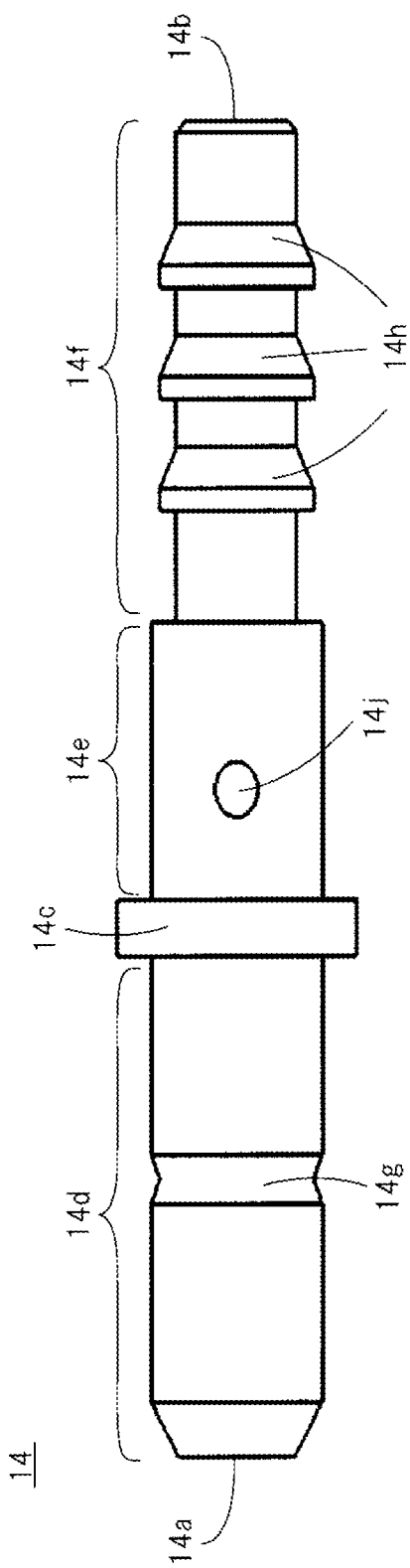
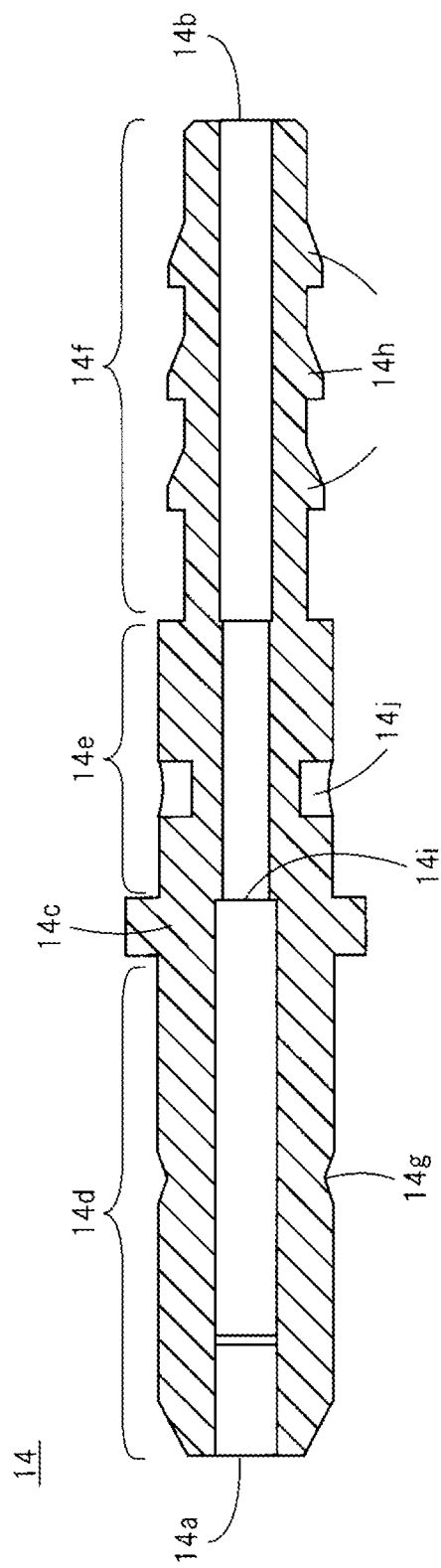
FIG. 3A
FIG. 3B

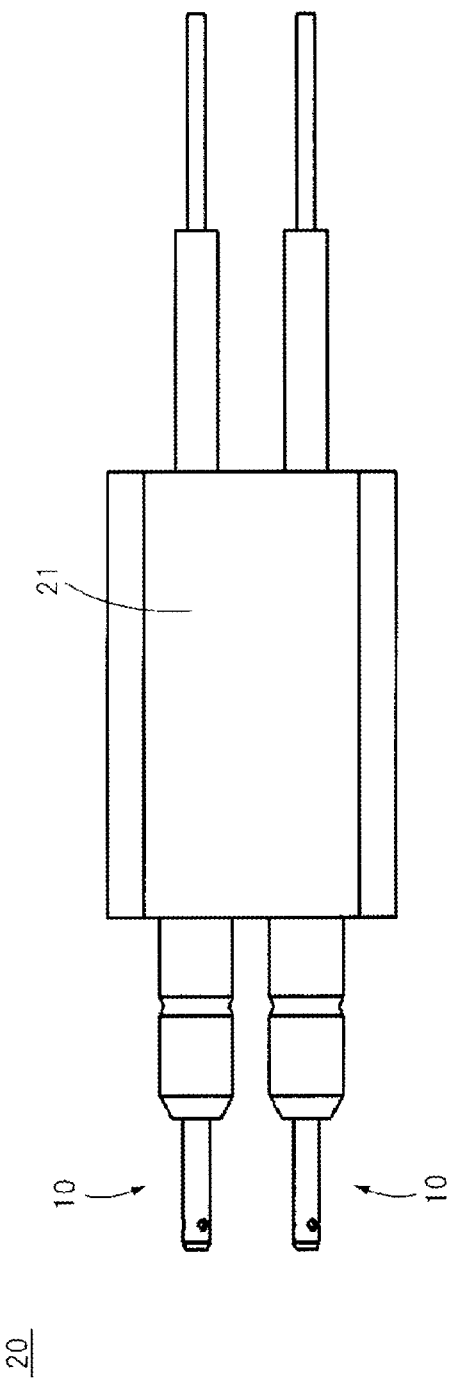
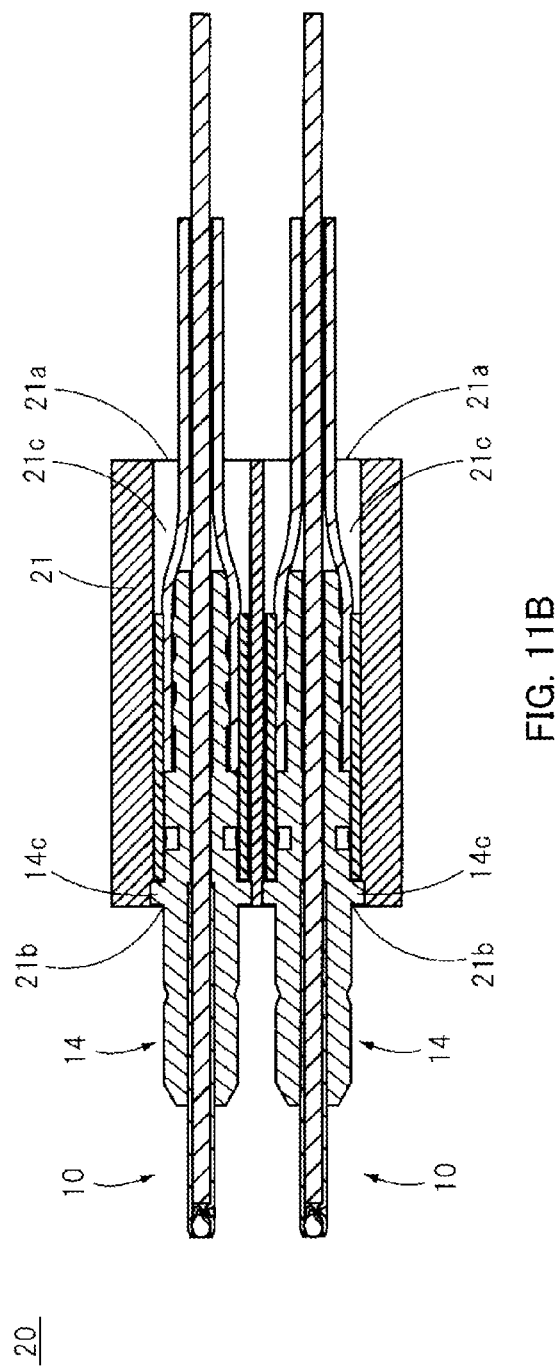

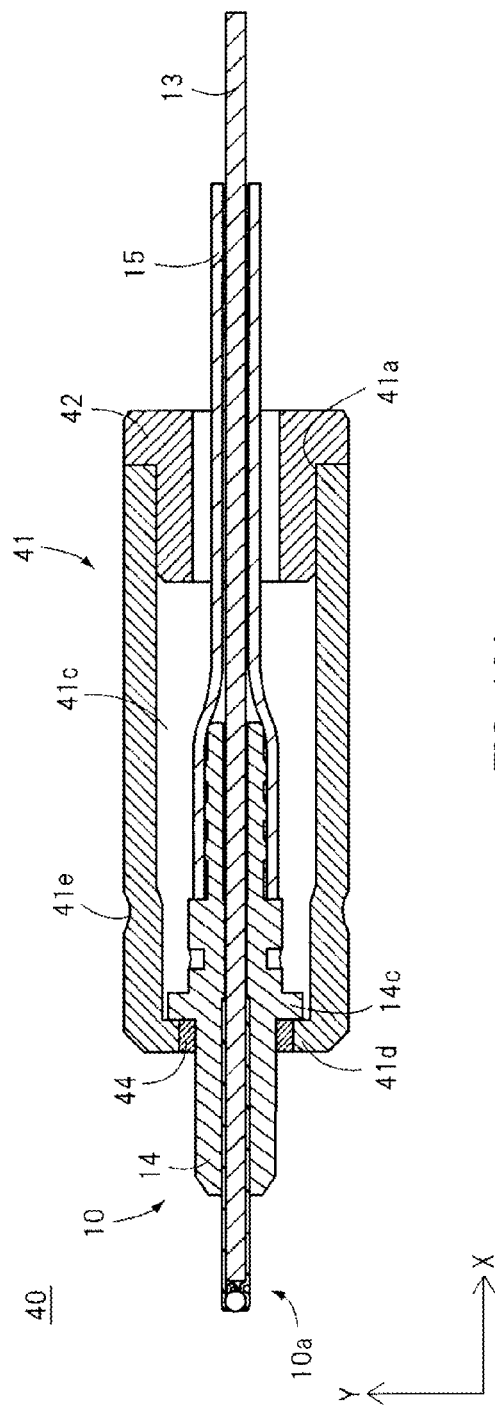
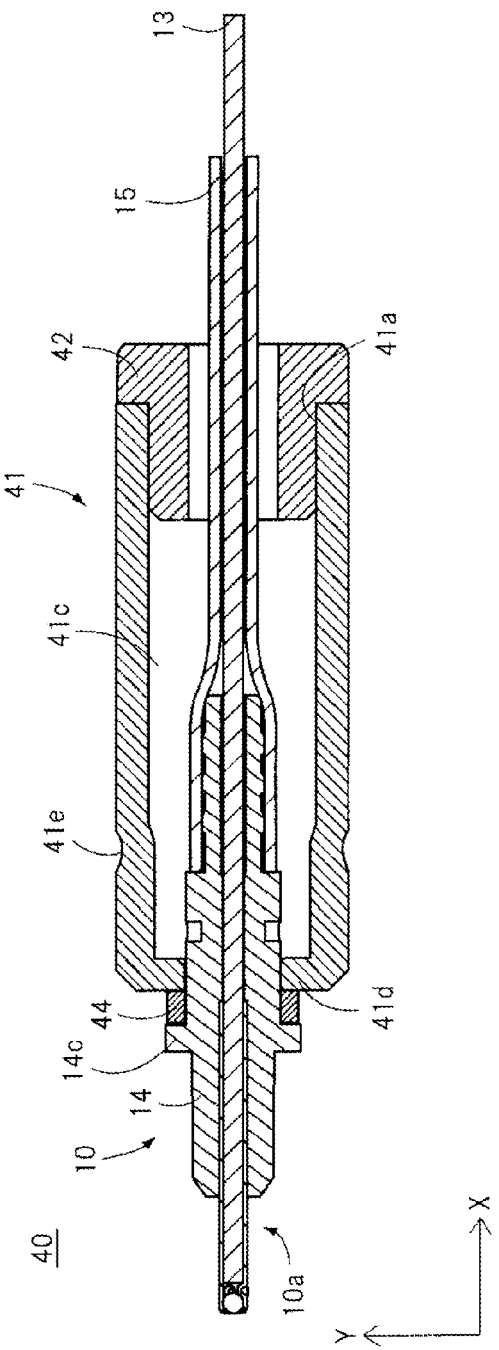
FIG. 16A
FIG. 16B

OPTICAL CONNECTOR

TECHNICAL FIELD

The present invention relates to an optical connector using an optical collimator.

BACKGROUND ART

There has been proposed a technique of using a lens in connecting an optical fiber to any optical device with use of an optical connector thereby to improve connection efficiency, in which technique, an optical collimator is applied to connection of a single or a plurality of optical fibers.

In such an optical collimator, it is necessary to position an end surface of the optical fiber and a collimator lens. As a method for positioning the end surface of the optical fiber and the collimator lens, there is conventionally known a method of inserting a separate-component spacer into a holding member (for example, see patent literature 1).

Besides, as a method for assembling an optical connector, there is known a method of using a separate-component collet chuck for holding the optical fiber (for example, see patent literature 2).

CITATION LIST

Patent Literature

Patent Literature 1: Japanese Patent Application Publication No. 2007-241094
Patent Literature 2: Japanese Patent Application Publication No. 2003-270487

SUMMARY OF THE INVENTION

Technical Problem

For an optical connector used for the purpose of connecting an optical fiber to any optical device, it is required to have a small-size shape and maintain the positional relationship between the optical fiber and the collimator lens even when insertion into and pull-out from a mechanical device are repeated.

However, when a separate component is used for positioning of the end surface of the optical fiber and the collimator lens as disclosed in the patent literature 1, there are problems of an increase in number of components and complicated assembly process. Besides, the operation of inserting such a separate component into a holding member is more difficult as the optical connector becomes smaller in size, which causes a problem of an increase in cost required for this operation.

Further, when a separate component is used for holding an optical fiber in the assembly process of the optical connector as disclosed in the patent literature 2, there arise problems of further increase in number of components and more complicated assembly process.

The present invention was carried out in view of the foregoing and aims to provide an optical connector capable of positioning an optical fiber and a collimator lens with high accuracy without any complicated assembly step.

Solution to Problem

The present invention provides an optical connector comprising: a holding member configured to have an accommodating portion formed at an end thereof for accommodating a collimator lens and have an insertion hole formed at an opposite end thereof for inserting an optical fiber; and a resin joint configured to have a first insertion hole formed at an end thereof for inserting the holding member and have a second insertion hole formed at an opposite end thereof for inserting the optical fiber, wherein the collimator lens and the optical fiber are positioned by making at least one of the collimator lens and an end surface of the optical fiber abut against a recess formed in the holding member near the accommodating portion, and the resin joint has a fixing portion formed therein for fixing a part of the optical fiber positioned in the holding member inserted via the first insertion hole into the resin joint, the part being exposed from the holding member.

According to the above-described optical connector, at least one of the collimator lens and the optical fiber is made to abut against the recess formed in the holding member thereby to position the collimator lens and the optical fiber. With this structure, it is possible to position the collimator lens and/or the optical fiber with reference to the recess, thereby improving the working efficiency as compared with the conventional case of inserting a separate component into a holding member, and facilitating positioning of the collimator lens and the optical fiber while preventing any increase in cost. Besides, as the optical connector is assembled by fixing the optical fiber by the fixing portion formed in the resin joint, it is possible to reduce the number of components and facilitate the assembly process of the optical connector. This further makes it possible to eliminate any complicated assembly steps and to allow highly-accurate positioning of the collimator lens and the optical fiber.

In the above-described optical connector, it is preferable that the resin joint has a positioning portion configured to position the end of an insertion hole side of the holding member and the optical fiber is fixed to a position near the positioning portion. In this case, as the positioning portion for the holding member is provided, it is possible to, when the holding member is inserted into the resin joint, position the holding member easily. Further, as the optical fiber is fixed near the positioning portion, it is possible to achieve reliable fixation of the optical fiber.

Further, in the above-described optical connector, it is preferable that the fixing portion comprises a plurality of fixing portions concyclically formed on the resin joint. In this case, as the optical fiber can be fixed at the plural points on the same circumference, it is possible to achieve reliable fixation of the optical fiber.

Furthermore, in the above-described optical connector, it is preferable that a plurality of annular projections are formed spaced from each other on an outer circumferential surface of the resin joint for holding a jacket to protect the optical fiber. In this case, as the jacket can be supported by a part of the resin joint, it is possible to fix the jacket to cover the optical fiber effectively without an increase in number of components.

Still furthermore, in the above-described optical connector, it is preferable that an engaged portion is formed on an outer circumferential surface of the resin joint and the engaged portion engages with an engaging portion of a device when the optical connector is connected to the device. In this case, as the engaged portion formed at a part of the resin joint is used to be able to prevent displacement of the optical connector inserted into the device, it is possible to provide better connection between the optical connector and the device.

Still furthermore, in the above-described optical connector, it is preferable that a collar portion is formed annularly projecting on an outer circumferential surface of the resin joint for allowing the optical connector to be inserted into a device up to a connection point. In this case, as the optical connector can be inserted into the device up to the connection point by the collar portion, it is possible to position the optical connector at a predetermined position in the device.

Still furthermore, in the above-described optical connector, it is preferable that the optical connector comprises a plurality of optical connectors and the optical connectors are arranged in parallel with each other in a housing having a plurality of through holes formed therein, each of the through holes having an insertion hole of same diameter as an outer diameter of the collar portion and an opening of smaller diameter than the outer diameter of the collar portion. In this case, it is possible to configure an optical connector capable of large capacity communications with a plurality of optical connectors mounted therein by fitting the resin joint in the housing easily without any special component.

Still furthermore, it is preferable that the above-described optical connector further comprises: a housing having an insertion area for accommodating the optical connector in such a manner that the resin joint of the optical connector is exposed; and a spring for applying a force to move the optical connector relative to the housing in an insertion direction of the optical connector. In this case, as the optical connector mounted in the housing is configured to be movable within a predetermined range, it is possible to absorb displacement as to the shaft center when the optical connector is connected to the device, to eliminate complicated alignment and to allow highly-accurate positioning of the collimator and the optical fiber.

Still furthermore, in the above-described optical connector, it is preferable that the housing has an engaged portion that engages with an engaging portion formed in a device when the optical connector is mounted in the device. In this case, when the optical connector is built in the device, the engaged portion engages with the engaging portion, and thereby, it is possible to prevent displacement of the optical connector and the device and to allow reliable fixation of the optical connector to the device.

Still furthermore, in the above-described optical connector, it is preferable that the housing has a stopper formed extending inward on an opening of a front side in the insertion direction in the insertion area and the stopper abuts against the collar portion of the resin joint when the optical connector is inserted into the housing. In this case, as the collar portion is caught by the collar portion, it is possible to apply a force to move the optical connector in the insertion direction.

Still furthermore, in the above-described optical connector, it is preferable that a space is created between an outer circumferential surface of the resin joint and an inner circumferential surface of the stopper. In this case, it is possible to simply configure the optical connector mounted in the housing to be movable within a predetermined range.

Still furthermore, in the above-described optical connector, it is preferable that an elastic member is arranged between an outer circumferential surface of the resin joint and an inner circumferential surface of the stopper. In this case, it is possible to simply configure the optical connector mounted in the housing to be movable within a predetermined range.

Still furthermore, in the above-described optical connector, it is preferable that a space is created between an outer circumferential surface of the collar portion and an inner wall surface of the housing. In this case, it is possible to simply configure the optical connector mounted in the housing to be movable within a predetermined range.

The present invention also provides an optical connector comprising: n holding members (n is an integer equal to or greater than 2) each configured to have an accommodating portion formed at an end thereof for accommodating a collimator lens and have an insertion hole formed at an opposite end thereof for inserting an optical fiber of n optical fibers; and a resin joint configured to have n first insertion holes formed at an end thereof for inserting the holding members, respectively, and have n second insertion holes formed at an opposite end thereof for inserting the optical fibers, respectively, wherein the collimator lens and the optical fiber are positioned by making at least one of the collimator lens and an end surface of the optical fiber abut against a recess formed in the holding member near the accommodating portion, and the resin joint has fixing portions formed therein for fixing respective parts of the optical fibers positioned in the holding members inserted via the first insertion holes into the resin joint, the parts being exposed from the respective holding members.

According to the above-described optical connector, it is possible to provide an optical connector that includes a plurality of optical fibers and is capable of large-capacity communications, with a reduced number of components, thereby facilitating the manufacturing process and achieving cost reduction.

Further, in the above-described optical connector, it is preferable that the optical fiber is a plastic optical fiber. In this case, as the material is soft, it is possible to fix the optical fiber by caulking and reduce the number of components.

Technical Advantage of the Invention

According to the present invention, at least one of the collimator lens and the optical fiber is made to abut against the recess formed in the holding member thereby to position the collimator lens and the optical fiber. With this structure, it is possible to position the collimator lens and/or the optical fiber with reference to the recess, thereby improving the working efficiency as compared with the conventional case of inserting a separate component into a holding member, and facilitating positioning of the collimator lens and the optical fiber while preventing any increase in cost. Besides, as the optical connector is assembled by pressure-inserting the holding member into the resin joint and pressure-fixing the optical fiber, it is possible to reduce the number of components and facilitate the assembly process of the optical connector. This further makes it possible to eliminate any complicated assembly steps and to allow highly-accurate positioning of the collimator lens and the optical fiber.

BRIEF DESCRIPTION OF DRAWINGS

FIG. 3A is a plane view of a resin joint according to the first embodiment;

FIG. 3B is a cross sectional view of the resin joint according to the first embodiment;

FIG. 11A is a plane view of an optical connector according to a second embodiment;

FIG. 11B is a cross sectional view of the optical connector according to the second embodiment;

FIGS. 16A and 16B are cross sectional views each illustrating a modified example of the optical connector according to the fourth embodiment.

DESCRIPTION OF EMBODIMENTS

With reference to the accompanying drawings, embodiments of the present invention will be described in detail below.

Figure 1:
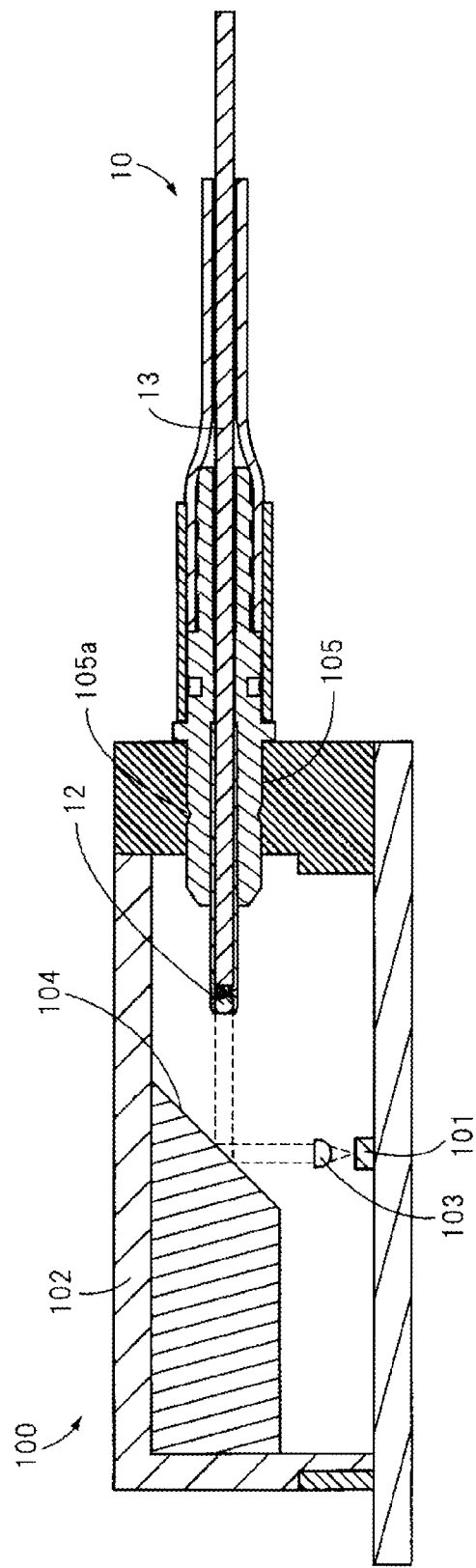
FIG. 1 is a cross sectional view schematically illustrating an optical connector according to the present invention connected to a device.

First description is made about an optical connector according to the present invention, which is connected to a device. FIG. 1 is a cross sectional view schematically illustrating the optical connector according to the present invention connected to the device. In FIG. 1, for convenience of explanation, the device is a device having a light-receiving/light-emitting element, however, the present invention is not limited to this device, which may be modified appropriately.

As illustrated in FIG. 1, the device 100 to which the optical connector 10 according to the present invention is connected is configured to have a light-receiving/light-emitting element 101 arranged inside a case 102 and to have a light-gathering lens 103 and an inclined polished surface 104 arranged along the optical axis of the light-receiving/light-emitting element 101, the light-gathering lens 103 being supported by a supporting member (not shown). Besides, in a side surface of the case 102 of the device 100, an opening 105 is provided for inserting the optical connector 10.

In the device 100, laser light emitted from the light-emitting element 101 is reflected off the inclined polished surface 104 via the light-gathering lens 103 and is guided to the opening 105. Then, the light reflected off the inclined polished surface 104 is gathered by a collimator lens 12 of the optical connector 10 and is input to the optical fiber 13. The input light propagates in the optical fiber 13. In FIG. 1, an optical path of the laser light emitted from the light-emitting element 101 is indicated by the dotted line.

Further, in the device 100, the light propagating through the optical fiber 13 passes through the collimator lens 12 thereby to be collimated. Then, the laser light output from the optical fiber 13 is reflected off the inclined polished surface 104 and is guided to the light-receiving element 103 via the light-gathering lens 103. Here, in FIG. 1, an optical path of the laser light output from the optical fiber 13 is indicated by the dotted line.

The device 100 according to the present embodiment is configured such that, when the optical connector 10 is inserted up to a predetermined position inside the case 102, laser light propagating between the light-receiving/light-emitting element 101 and the optical fiber 13 can be input or output appropriately via the light-gathering lens 103 and the inclined polished surface 104. Connected to this device 100 is the optical connector 10 according to the present embodiment, which structure is described below.

First Embodiment

Figure 2:
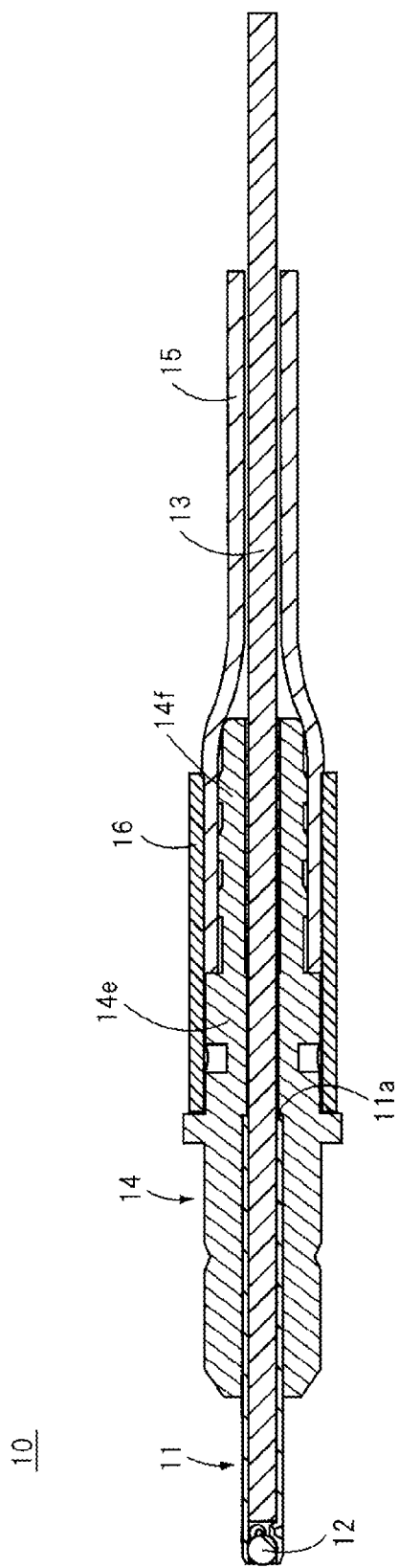
FIG. 2 is a cross sectional view of an optical connector according to a first embodiment of the present invention.

FIG. 2 is a cross sectional view of the optical connector 10 according to the first embodiment of the present invention. As illustrated in FIG. 2, the optical connector 10 has a holder 11 that serves as a holding member having an almost cylindrical shape, the collimator lens 12 that is supported by an end of this holder 11, the optical fiber 13 that is inserted through an insertion hole 11a provided at the other end of the holder 11, a resin joint 14 configured to hold the holder 11 and the optical fiber 13, a jacket configured to cover the optical fiber 13, and a metal member 16 that has an almost cylindrical shape and is configured to fix the jacket 15. In the optical connector 10 according to the first embodiment, the optical fiber 13 to be suitably inserted is a plastic optical fiber. The plastic optical fiber may be a plastic fiber having a glass core and a plastic cladding.

The holder 11, the collimator lens 12 and the optical fiber 13 constitute an optical collimator 10a, which will be described in detail below.

FIG. 3A is a plane view of the resin joint 14 and FIG. 3B is a cross sectional view of the resin joint 14. As illustrated in FIGS. 3A and 3B, the resin joint 14 takes an almost cylindrical shape and has an insertion hole 14a formed at an end for inserting the holder 11, an opening 14b formed at the other end for inserting the optical fiber 13 and a ring-shaped collar portion 14c formed at the center. In the resin joint 14, a section extending from the collar portion 14c to the insertion hole 14a is called a first cylindrical section 14d, and in a section extending from the collar portion 14c to the opening 14b, a part near the collar portion 14a is called a second cylindrical section 14e and a part near the opening 14b is called a jacket holding section 14f. In the first cylindrical section 14d, an engaged portion 14g is provided in a groove shape at the center of the section. The first cylindrical section 14d and the second cylindrical section 14e have almost the same diameters. The jacket holding section 14f has a smaller diameter than the first cylindrical section 14d, and in the jacket holding section 14f, a plurality of ("three" in the present embodiment) annular projections 14h are provided spaced from each other. In each of the annular projections 14h, an end surface of the second cylindrical section 14e side of the annular projection is vertical to the outer circumferential surface of the jacked holding section 14f and the other end of the opening 14b side of the annular projection is tapered. However, the shape of each annular projection 14h is not limited to this and may be a semicircular or reversed V shape.

The outer diameter of the collar portion 14c is larger than the inner diameter of the opening 105 in the device 100 to which the optical connector 10 is connected. Therefore, when the optical connector 10 is inserted into the device 100, the optical connector 10 is always inserted into the device 100 up to the collar portion 14c and thereby it is possible to position the optical connector 10 at a predetermined position inside the case 102. And, when the optical connector 110 is connected to the device 100, the engaged portion 14g engages with an engaging portion 105a provided in the inner circumferential surface of the opening 105 in the device 100 (see FIG. 1). The engaged portion 14g is provided to prevent displacement of the optical connector 10 inserted into the device 100 and provide preferable connection between the optical connector 10 and the device 100.

Further, in the inner circumferential surface of the resin joint 14, there is provided a positioning portion 14i at the boundary between the collar portion 14c and the second cylindrical section 14e. The inner diameter of the resin joint 14 changes at the positioning portion 14i. In other words, the inner diameter of the resin joint 14 from the positioning portion 14i to the opening 14b is configured to be smaller than the inner diameter from the positioning portion 14i to the insertion hole 14a. Here, the inner diameter from the positioning portion 14i to the insertion hole 14a is configured to be almost the same as the outer diameter of the holder 11, and the inner diameter from the positioning portion 14i to the opening 14b is configured to be almost the same as the outer diameter of the optical fiber 13.

Further, the resin joint 14 illustrated in FIG. 3 has a plurality of fixing portions 14j (two fixing portions in the present embodiment) concyclically formed (on the same circumference) in the second cylindrical section 14e near the positioning portion 14i. With these fixing portions, it is possible to secure the optical fiber at the plural points on the same circumference near the positioning portion 14i, thereby allowing reliable fixation of the optical fiber 13. For example, the fixing portions 14j are formed by pressing the resin joint 14 from the outside with use of a tool after the optical fiber 13 is inserted into the resin joint 14 so as to fasten the optical fiber 13.

The jacket 15 is formed of, for example, an elastic material or tensile fibers and, as illustrated in FIG. 2, the jacket 15 covers the optical fiber 13 almost entirely along the longitudinal direction of the optical fiber 13 exposed from the resin joint 14 or the jacket holding section 14f of the resin joint 14. The jacket 15 is not in close contact with the optical fiber 13, and the jacket 15 covers the optical fiber 13 with a small gap therebetween. Therefore, even when the jacket 15 is pulled, there is no force applied to the optical fiber 13, thereby preventing any break in the optical fiber 13. Besides, the jacket holding section 14f on which the jacket 15 is arranged is almost equal in the diameter to the second cylindrical section 14e.

A metal member 16 is formed to have slits zigzag-shaped in the longitudinal direction. The metal member 16 is fixed as covering the jacket 15 provided on the jacket holding section 14f and the second cylindrical section 14e of the resin joint 14.

Figure 4:
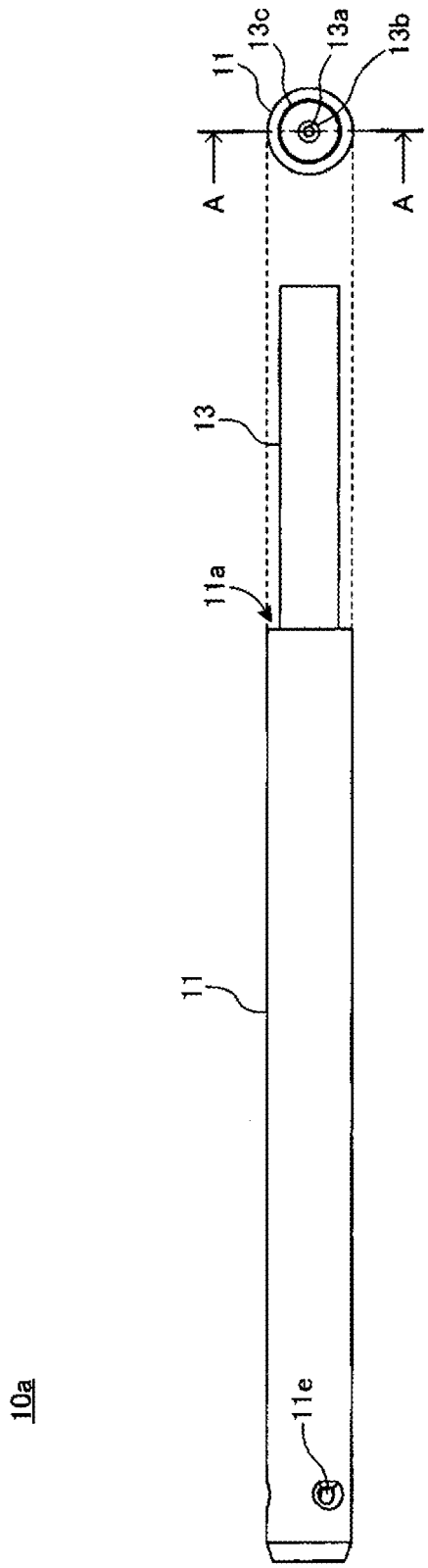
FIG. 4 is a side view of an optical collimator according to the first embodiment.
Figure 5:
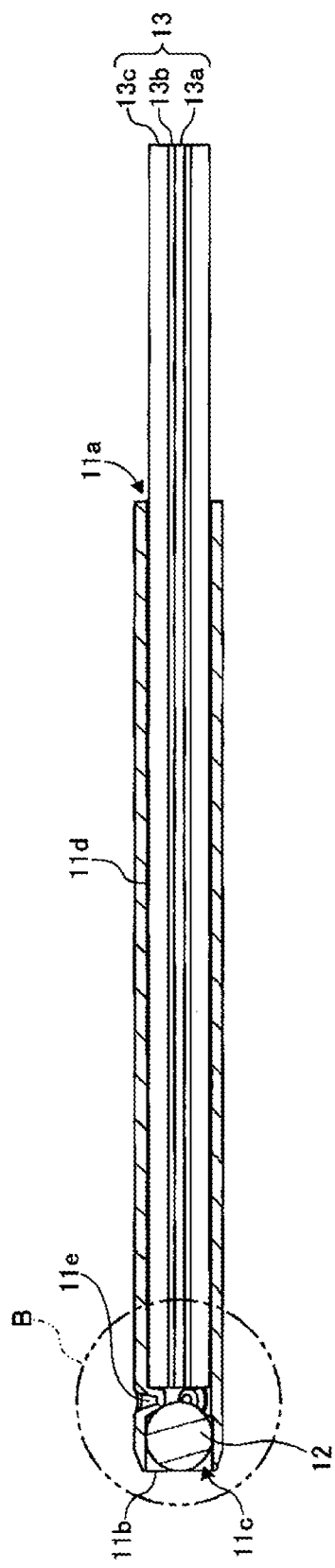
FIG. 5 is a cross sectional view taken along the line A-A in FIG. 4.

Next description is made in detail about the optical collimator 10a formed with the optical fiber 13, the collimator lens 12 and the holder 11 used in the optical connector 10 according to the first embodiment. FIG. 4 is a side view of the optical collimator 10a according to the first embodiment. FIG. 5 is a cross sectional view taken along the arrows A-A in FIG. 4.

The holder 11 is formed, for example, with a metal material such as stainless steel. Particularly, in terms of machinability, the holder 11 is preferably formed with austenitic stainless steel. As illustrated in FIG. 5, at an end of the collimator lens 12 side of the holder 11, an opening 11b is formed. Inside this opening 11b, an accommodating portion 11c is provided to accommodate the collimator lens 12. This accommodating portion 11c is configured to have such a size as to accommodate the collimator lens 12 entirely inside it for the purpose of preventing any damage to the surface of the collimator lens 12, and is also configured such that the collimator lens 12 can be pressure-inserted. Besides, inside the holder 11, there is provided a through hole 11d whose diameter is slightly larger than the diameter of the optical fiber 13. This through hole 11d passes through the insertion hole 11a and is provided communicating with the accommodating portion 11c. Further, in the holder 11, a plurality of recesses 11e are provided by pressing the outer circumferential surface of the holder 11 with use of a tool. These recesses 11e are provided between the accommodating portion 11c and the through hole 11d and is used to position the collimator lens and the optical fiber 13, which is described later.

The collimator lens 12 is formed, for example, with glass into a spherical ball lens. As illustrated in FIG. 5, the collimator lens 12 is held inside the accommodating portion 11c of the holder 11, where the collimator lens 12 is arranged facing the tip end of the optical fiber 13 inserted in the through hole 11d.

The optical fiber 13 has a core 13a provided passing through the center of the optical fiber 13, a cladding 13b covering the core 13a and a reinforcing layer 13c for covering the cladding 13b to reinforce the optical fiber 13. The optical fiber 13 is preferably a plastic optical fiber. At an end surface of the optical fiber 13 facing the collimator lens 12, the core 13a, the cladding 13b and the reinforcing layer 13c are arranged to be flush with each other. That is, in the end surface facing the collimator lens 12, the core 13a, the cladding 13b and the reinforcing layer 13c are aligned with each other.

Besides, the optical fiber 13 is inserted into the through hole 11d via the insertion hole 11a and its tip end is fixed near the collimator lens 12 as facing the spherical surface of the collimator lens 12.

In the optical collimator 10a according to the first embodiment, the optical fiber 13 is, for example, a graded index (GI) optical fiber in which the refractive index changes continuously in the cross section vertical to the fiber axis. And, the core 13a and the cladding 13b are, for example, formed with perfluoro resin where H in C—H bonds substitutes for F. In this way, as the optical fiber 13 is a GI optical fiber formed with perfluoro resin, it is possible to achieve higher-speed and larger-capacity communications.

In the thus-configured optical collimator 10a according to the first embodiment, the recesses 11e are used which are provided in the holder 11 for positioning the collimator lens 12 and the optical fiber 13 simply while preventing an increase in cost. Specifically, a part of the collimator lens 12 and a part of the optical fiber 13 are made to abut against the recesses 11e formed in the holder 11 and positioned, thereby eliminating the need to provide any spacer for positioning them, preventing cost increase and facilitating positioning of the collimator lens 102 and the optical fiber 13.

Figure 6:
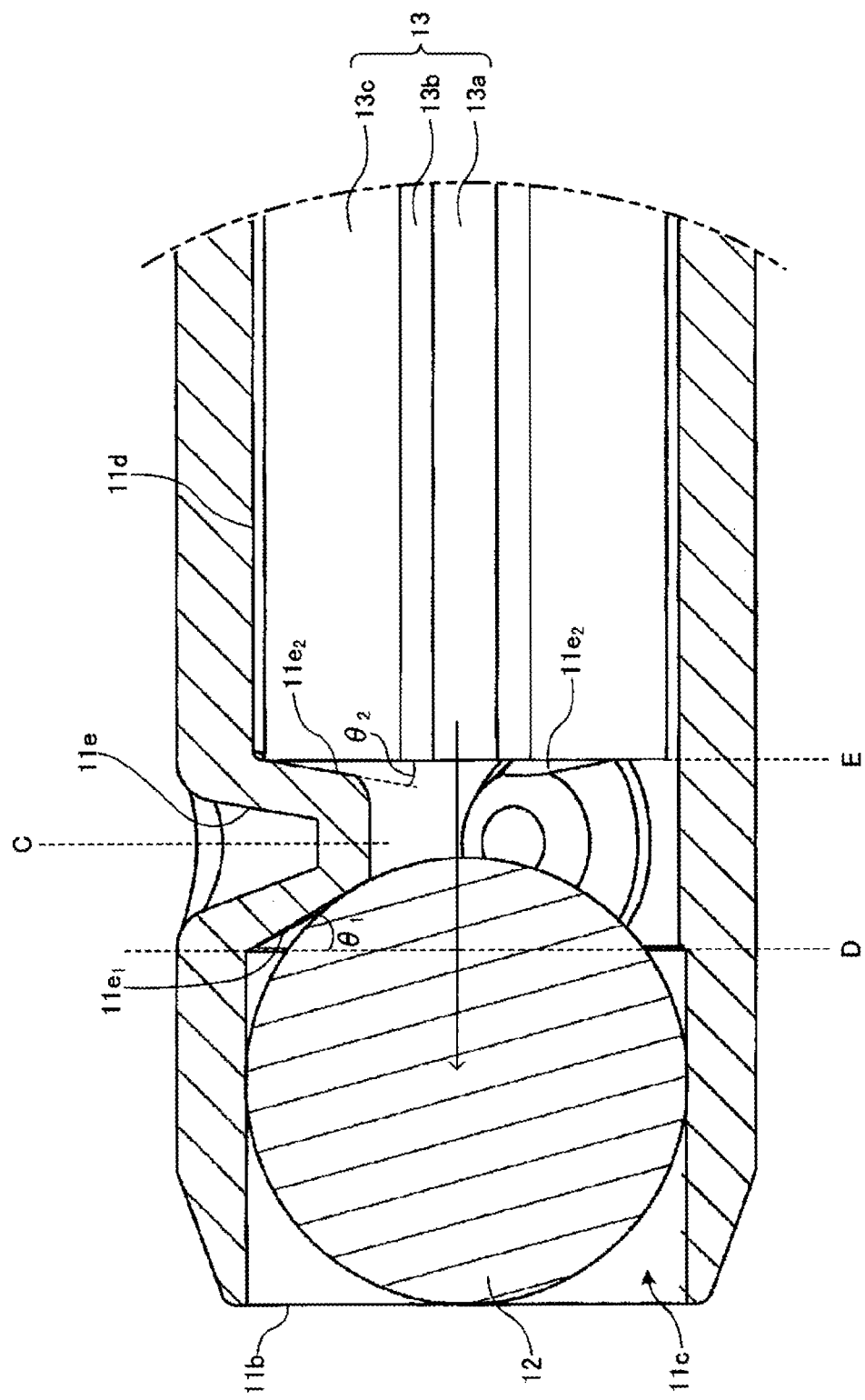
FIG. 6 is an enlarged view of a part enclosed with the chain double-dashed line B in FIG. 5.

Here, description is made about the method for positioning the optical fiber 13 and the collimator lens 12 in the holder 11 of the optical collimator 10a according to the first embodiment, with reference to FIG. 6. FIG. 6 is an enlarged view of the part enclosed with the chain double-dashed line B in FIG. 5. As illustrated in FIG. 6, in each of the recesses 11e, a part facing the collimator lens 12 abuts against a part of the collimator lens 12 and a part facing the optical fiber 13 abuts against the cladding 13b or the reinforcing layer 13c other than the core 13a of the optical fiber 13 or a part of the cladding 13b and the reinforcing layer 13c. The collimator lens 12 and the optical fiber 13 are positioned at their predetermined positions in the holder 11, while they abut against the recesses 11e.

As illustrated in FIG. 6, each recess 11e is configured such that with respect to the plane orthogonal to the insertion direction of the optical fiber 13 (for example, the plane C that is arranged in parallel with the end surface of the optical fiber illustrated in FIG. 6 and passes through the center of the recess 11e), an angle of a part facing the collimator lens 12 is different from an angle of 11e are provided, for example, by pressing with use of pointed or tapered tools of different tip-end shapes. As pressing is performed with use of such tools, the recesses 11e are formed such that the angle of a part facing the collimator lens 12 becomes different from the angle of a part facing the optical fiber 13 with respect to the center axis in the pressing operation, thereby making it possible to position the different-shaped collimator lens 12 and optical fiber 13 effectively.

Further, in the optical collimator 10a according to the first embodiment, these recesses 11e are provided in plural (three in the present embodiment) and concyclically on the holder 11 (on the same circumference of the holder 11). Forming of the recesses 11e on the same circumference can be performed by pressing the outer circumference of the holder 11 simultaneously with use of the above-mentioned tools of different tip-end shapes. As the plural recesses 11e are thus formed concyclically, it is possible to make the collimator lens 12 and the optical fiber 13 abut to the recesses 11e at plural points, thereby being able to position the collimator lens 12 and the optical fiber 13 with higher accuracy.

As a part facing the collimator lens 12 in each recess 11e forms an inclined surface $11e_1$. This inclined surface $11e_1$ is provided to form an angle $\theta_1$ of 0 to 45 degrees inclusive with respect to a plane orthogonal to the insertion direction of the optical fiber 13 illustrated by the arrow in FIG. 6 (for example, the plane D that is arranged in parallel with the end surface of the optical fiber 13 illustrated in FIG. 6 and passes through the base part of the recess 11e). As the angle $\theta_1$ of the inclined surface $11e_1$ at the collimator lens 12 side is thus formed to be 0 to 45 degrees inclusive with respect to the plane D orthogonal to the insertion direction of the optical fiber 13, it is possible to support and position a part of the optical fiber 13 side of the collimator lens 12, thereby enhancing the positional accuracy of the collimator lens 12.

On the other hand, a part facing the optical fiber 13 in each recess 11e forms an inclined surface $11e_2$. This inclined surface $11e_2$ is provided to form an angle $\theta_2$ of 20 degrees or less with respect to a plane orthogonal to the insertion direction of the optical fiber 13 (for example, the plane E that is arranged in parallel with the end surface of the optical fiber 13 illustrated in FIG. 6). As the angle $\theta_2$ of the inclined surface $11e_2$ is thus formed to be 20 degrees or less with respect to the plane E, it is possible to, when the core 13a, the cladding 13b and the reinforcing layer 13c are arranged to be flush with each other as described above, make the end surface of the optical fiber 13 abut to the recess 11e, thereby achieving the higher positional accuracy more easily.

As described up to this point, in the optical collimator 10a according to the present invention, a part of the collimator lens 12 and a part of the optical fiber 13 are made to abut against the recesses 11e formed in the holder 11 thereby to position the collimator 12 and the optical fiber 13. With this structure, the collimator lens 12 and the optical fiber 13 are able to be positioned with reference to the recesses 11e, thereby making it possible to improve the working efficiency as compared with the case where a separate component is inserted into the holder 11, preventing cost increase and facilitating positioning of the collimator lens 12 and the optical fiber 13.

Next description is made about the assembly process of the optical connector 10 according to the first embodiment, with reference to FIGS. 7 to 10. FIGS. 7 to 10 are explanatory views illustrating the sequential steps for assembly of the optical connector 10.

Figure 7:
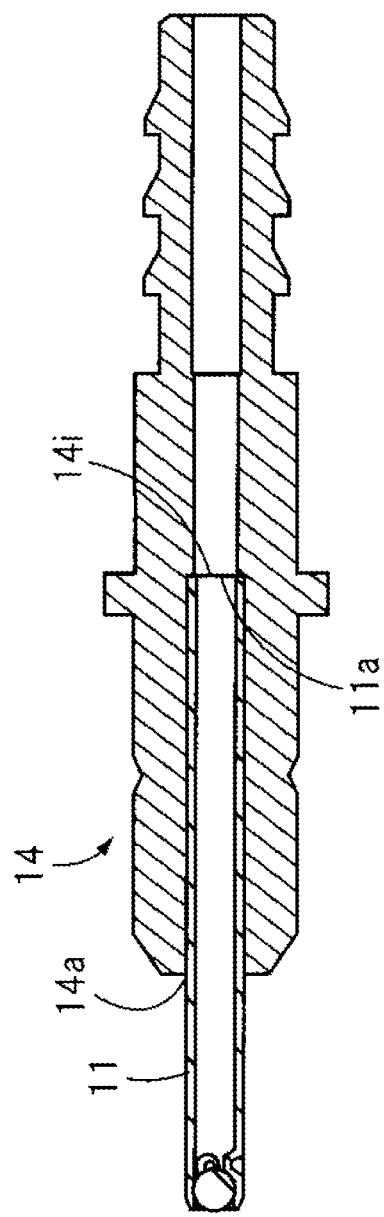
FIG. 7 is an explanatory view illustrating an assembly process of an optical connector according to the first embodiment.

First, as illustrated in FIG. 7, the holder 11 is pressure-inserted via the insertion hole 14a of the resin joint 14. The holder 11 pressure-inserted via the insertion hole 14a stops when the insertion hole 11a of the holder 11 abuts against the positioning portion 14i. Then, the holder 11 is positioned at the predetermined position. Thus, the positioning portion 14i of the holder 11 is provided in the resin joint 14, it becomes possible to position the holder 11 simply when the holder 11 is inserted into the resin joint 14.

Figure 8:
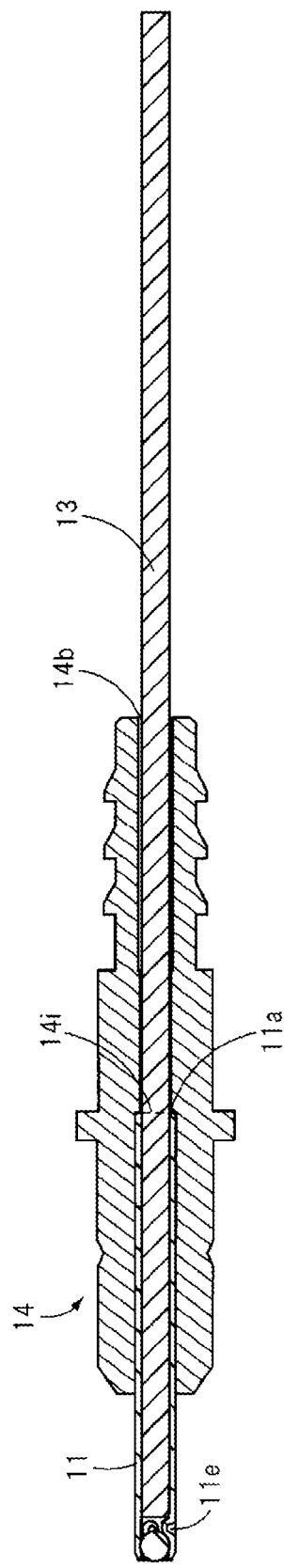
FIG. 8 is an explanatory view illustrating the assembly process of an optical connector according to the first embodiment.

Then, as illustrated in FIG. 8, the optical fiber 13 is inserted via the opening 14b of the resin joint 14. The optical fiber 13 is guided by the inner diameter of the resin joint 14 to reach the insertion hole 11a of the holder 11, and then, guided by the inner diameter of the holder 11 to the recesses 11e. When the optical fiber 13 abuts against the recesses 11e, the insertion step is finished. At this time, the optical fiber 13 is positioned at the predetermined position. And, as the inner diameter from the positioning portion 14i to the opening 14b is configured to be almost equal to the outer diameter of the optical fiber 13, the optical fiber 13 is able to be fixed reliably.

Figure 9:
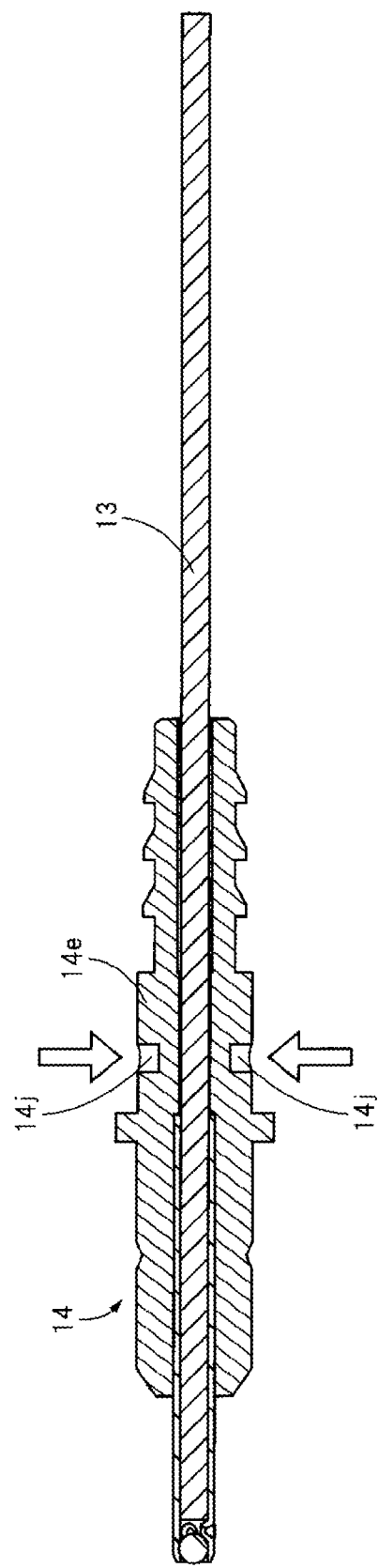
FIG. 9 is an explanatory view illustrating the assembly process of an optical connector according to the first embodiment.

Next, as illustrated in FIG. 9, the second cylindrical section 14e of the resin joint 14 is subjected to pressing with use of the tools and the plural fixing portions 14j (two in the present embodiment) are formed to secure the optical fiber 13. With these fixing portions 14j, the optical fiber and the resin joint 14 are pressure-fixed to each other so that the optical fiber 13 can be fixed reliably. In this way, as the optical fiber 13 used here is a plastic optical fiber made of a soft material, it is possible to fasten the optical fiber by caulking and also to reduce the number of components.

Figure 10:
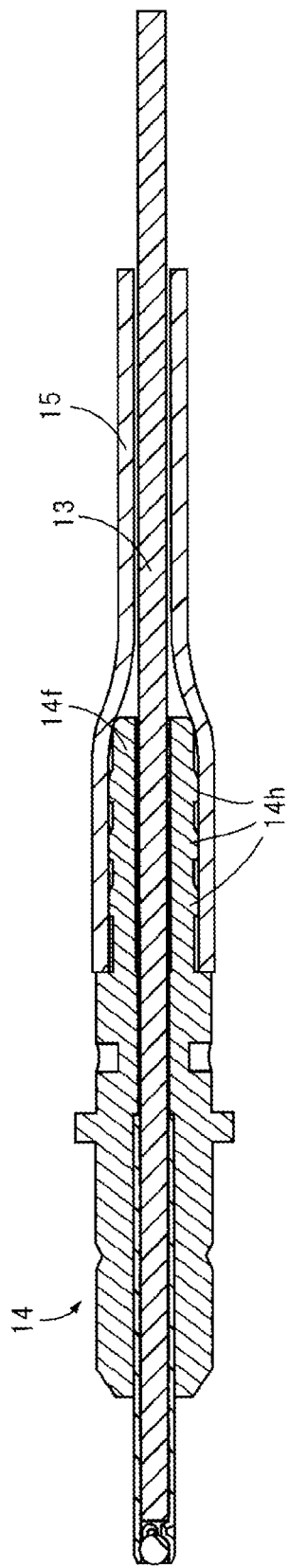
FIG. 10 is an explanatory view illustrating the assembly process of an optical connector according to the first embodiment.

Next, as illustrated in FIG. 10, the jacket 15 is provided to cover the optical fiber 13 entirely along the longitudinal direction of the optical fiber 13 exposed from the jacket holding section 14f of the resin joint 14 or the resin joint 14. As the jacket is fixed to the jacket holding section 14f by the annular projections 14h formed in the jacket holding section 14f, it is possible to fix the jacket 15 covering the optical fiber 13 efficiently without any increase in components.

Finally, the metal member 16 is provided on the jacket holding section 14f and the second cylindrical section 14e of the resin joint 14 so as to fasten the jacket 15 reliably. The metal member 16 sandwiches the resin joint 14 by wide-opening the slits of the metal member 16, and then, the slits of the metal member 16 are closed to install the metal member 16. Through these steps, the optical connector 10 illustrated in FIG. 2 can be assembled completely.

As described up to this point, in the optical connector 10 according to the first embodiment, a part of the collimator lens 12 and a part of the optical fiber 13 are made to abut to the recesses 11e provided in the holder 11 thereby to position the collimator lens 12 and the optical fiber 13. With this structure, as the collimator lens 12 and the optical fiber 13 can be positioned with reference to the recesses 11e, it is possible to improve the working efficiency as compared with the conventional case where a separate component is inserted into the holder 11, to prevent any increase in cost and position the collimator lens 12 and the optical fiber 13 more easily. Further, as the holder 11 is pressure-inserted into the resin joint 14 and the optical fiber 13 is pressure-fixed thereby to assemble the optical connector 10, it is possible to assemble the optical connector 10 more simply and with a reduced number of components. Consequently, it is possible to eliminate any complicated assembly steps and position the collimator lens and the optical fiber with high accuracy.

For example, in the optical connector used for intra-device or inter-device large-capacity communications using optical fibers, if any partition (spacer portion) for positioning an optical fiber and a collimator lens is formed as in the conventional example, it is necessary to do any works such as cutting in a holding member (holder) formed of a metal material. However, the holding member for the optical connector used for the above-mentioned purpose is small in size, and therefore, the cutting accuracy is reduced and an increase in working cost (cost due to dimensional-error products) becomes remarkable. On the other hand, in the holder 11 of the optical connector 10 according to the first embodiment, no partition (spacer portion) is formed by cutting in the holder 11 as a holding member but recesses 11e are formed by plastic forming. With this structure, it is possible to reduce the cost for working significantly.

Further, in the optical connector 10 according to the first embodiment, the collimator lens 12 and the optical fiber 13 are positioned by the recesses 11e formed in the holder 11 while the optical fiber is fixed by the fixing portions 14j formed in the resin joint 14. In such a case, the optical fiber 13 is firmly fixed while it is positioned properly. Therefore, for the purpose of performing inter-device or intra-device large-capacity communications using the optical fiber 13, even if pulling-out and inserting are performed repeatedly, it is possible to maintain the positional relationship between the optical fiber 13 and the collimator lens 12.

Here, in the above-described embodiment, the collimator lens 12 and the optical fiber 13 are positioned by making a part of the collimator lens 12 and a part of the optical fiber 13 abut against the recesses 11e formed in the holder 11. However, the method for positioning the collimator lens 12 and the optical fiber 13 is not limited to this and may be modified appropriately. For example, instead of the method of making both of the collimator lens 12 and the optical fiber 13 abut to the recesses 11e, one of the collimator lens 12 and the optical fiber 13 may be made to abut to the recesses and the other may be positioned by a portion of the holder 11 other than the recesses 11e. However, such a case is based on a premise that the portion for positioning the other is designed to have a fixed positional relationship with the recesses 11e. In other words, the optical connector 10 according to the present invention includes an optical connector which is configured to make either of the collimator lens 12 and the optical fiber 13 abut against the recesses 11e.

Second Embodiment

An optical connector according to the second embodiment is a combination of optical connectors according to the first embodiment. The following description is made about the structure of the optical connector according to the second embodiment, with reference to FIGS. 11A and 11B. FIG. 11A is a plane view of the optical connector 20 according to the second embodiment and FIG. 11B is a cross sectional view of the optical connector 20. In FIGS. 11A and 11B, the parts corresponding to those in the first embodiment illustrated in FIGS. 2 to 10 are denoted by the like reference numerals and their explanation is omitted here.

As illustrated in FIGS. 11A and 11B, the optical connector 20 is configured to have two optical connectors 10 according to the first embodiment placed in parallel with each other and fit in a housing 21. The housing 21 has an almost box-shaped and has insertion holes 21a for inserting the optical connectors 10 in a surface. In a surface opposite to the surface where the insertion holes 21a are formed, openings 21b are formed from which the optical connectors 10 are exposed. That is, the housing 21 has a plurality of through holes 21c for inserting a plurality of optical connectors 10 in parallel with each other. The inner diameter of each of these through holes 21c is configured to be almost equal to the outer diameter of the collar portion 14c provided on the resin joint 14 in the optical connector 10. Besides, the inner diameter of the opening 21b is configured to be smaller than the outer diameter of the collar portion 14c provided in the resin joint 14 in the optical connector 10. Accordingly, the optical connector 10 inserted from each insertion hole 21a is positioned when the collar portion 14c abuts against the opening 21b. And, in this case, the outer circumference of the collar portion 14c abuts against the inner circumference of the through hole 21c thereby to fix the optical connector 10. As the optical connector 10 is thus positioned and fixed by the collar portion 14c, it is possible to fix the housing 21 and the resin joint 14 simply without any special component, thereby forming the optical connector 20 capable of large-capacity communications with plural optical connectors 10 installed thereon.

Third Embodiment

Figure 12A:
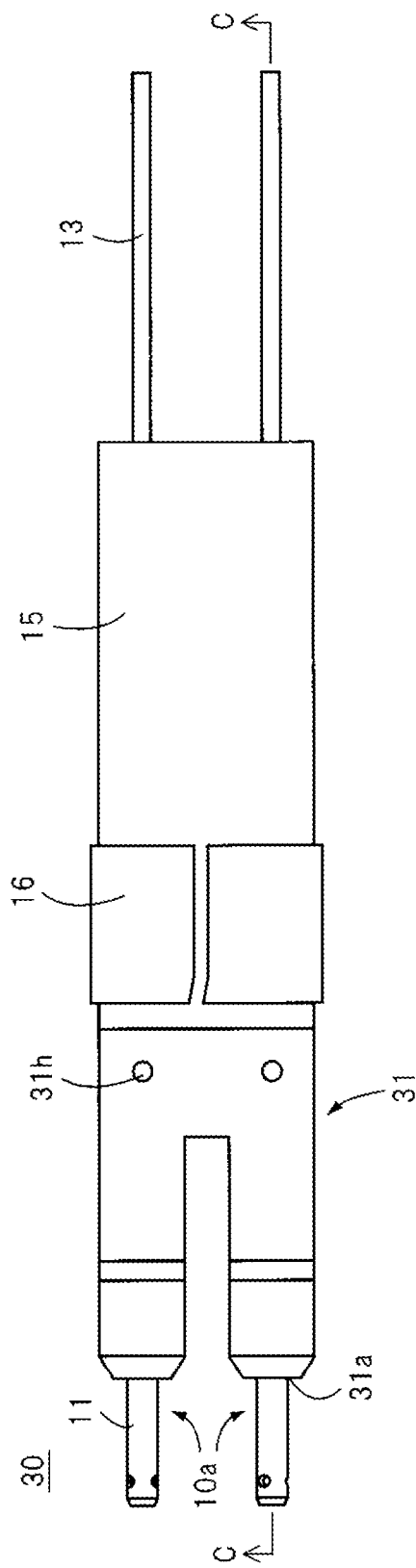
FIG. 12A is a plane view of an optical connector according to a third embodiment.
Figure 12B:
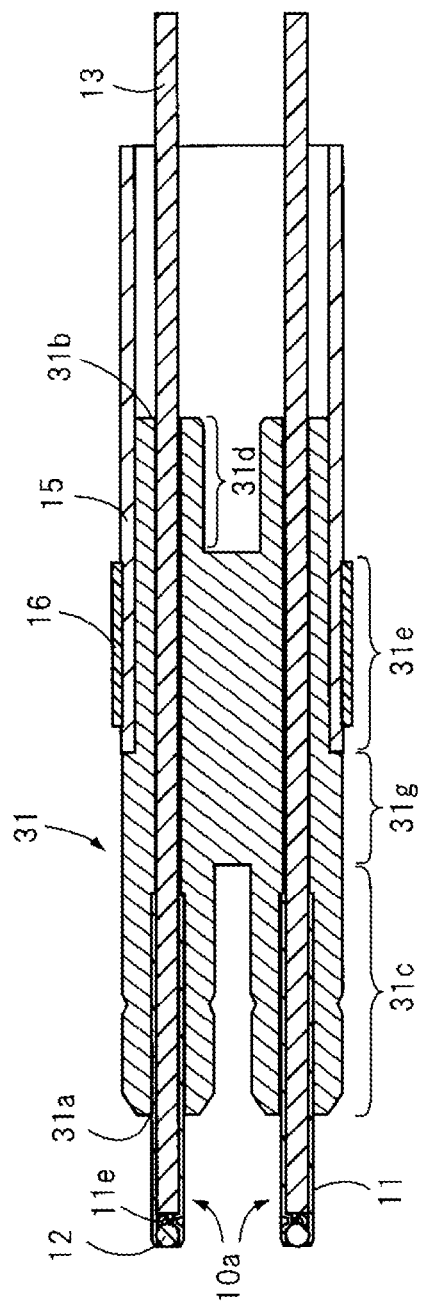
FIG. 12B is a cross sectional view of the optical connector according to the third embodiment.
Figure 13:
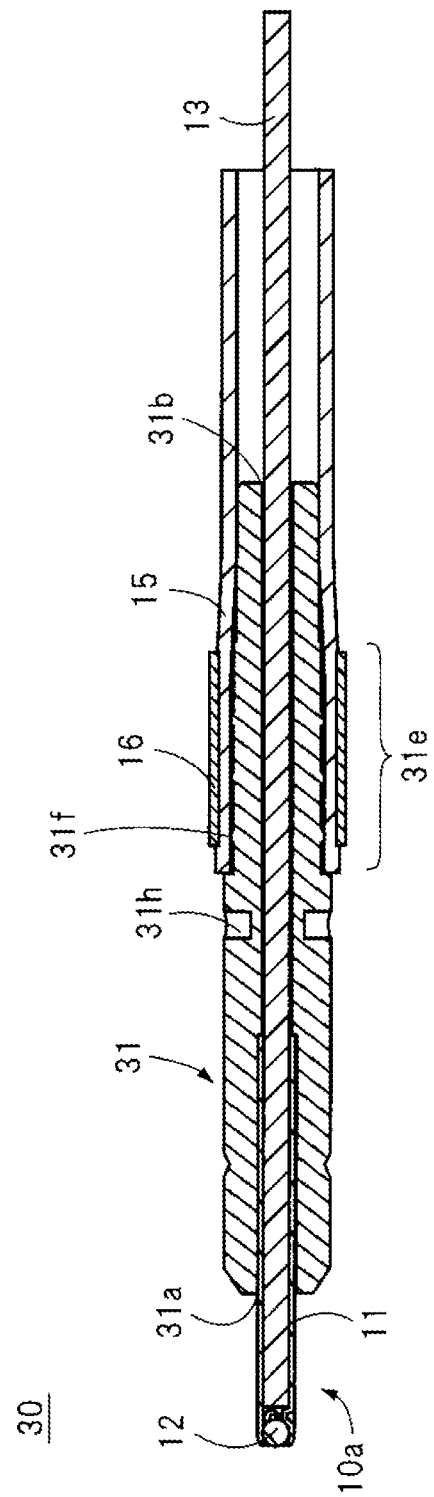
FIG. 13 is a cross sectional view taken along the line C-C in FIG. 12A.

An optical connector according to the third embodiment is such that a plurality of optical collimators 10a according to the first embodiment are placed in parallel with each other. The following description is made about the structure of the optical connector according to the third embodiment, with reference to FIGS. 12A, 12B and 13. FIG. 12A is a plane view of the optical connector 30 according to the third embodiment, and FIG. 12B is a cross sectional view of the optical connector 30. FIG. 13 is a cross sectional view taken along the line C-C in FIG. 12A. Here, in FIGS. 12A to 13, the parts corresponding to those in the optical connector 10 according to the first embodiment illustrated in FIGS. 2 to 10 are denoted by the like reference numerals and their explanation is omitted here.

The optical connector 30 is configured to have a plurality of optical collimators 10a (two optical collimators in the present embodiment) arranged in line with each other in an integral joint 31. The integral joint 31 is formed of a resin material and both ends are branched off corresponding in number to the insertable optical collimators 10a. At an end, insertion holes 31a are formed for inserting the holders 11 and at the other end, openings 31b are formed for inserting the optical fibers 13. A branch section 31c at the insertion hole 31a side is configured to be almost the same as the first cylindrical section 14d (see FIG. 3) in the resin joint 14. A branch section 31d at the opening 31b side has a smaller-diameter cylindrical shape than the branch section 31c at the insertion hole 31a side. A part between the branch section 31c at the insertion hole 31a side and the branch section 31d at the opening 31b side has a cylindrical shape having an approximately elliptic cross section. In this cylindrical section 31g, fixing portions 31h are formed corresponding to each optical fiber 13 so as to fix the optical fiber 13. Here, the cross section of the cylindrical section 31g is not limited to the approximately elliptic shape as it varies in accordance with the number of inserted optical collimators 10a.

In a part extending from the approximately center portion of the integral joint 31 to the openings 31b and near the openings 31b, there is provided a jacket holding section 31e.

In the outer circumferential surface of the jacket holding section 31e, a plurality of projections 31f are provided as spaced from each other (see FIG. 13). The jacket holding section 31e is configured such that its outer diameter becomes smaller than the diameter of the adjacent cylindrical section 31g.

Then, description is made about the assembly steps of the optical connector 30.

First, the holders 11 with collimator lens 12 set therein are pressure-inserted via the insertion holes 31a of the integral joint 31. Then, the optical fibers 13 are inserted via the openings 31b of the integral joint 31. The optical fibers 13 are made to abut against the recesses 11e of the holders 11 and are positioned at the predetermined positions.

Next, the cylindrical section 31g of the integral joint 31 is subjected to pressing with use of tools, and thereby a plurality of fixing portions 31h are formed to fasten the optical fibers 13. With these fixing portions 31h, the optical fibers 13 and the integral joint 31 are pressure-fixed to each other thereby to fasten the optical fibers 13 reliably. Besides, as it is also possible to fix the optical fibers 13 by caulking without any special component, it is possible reduce the number of components.

Then, the jacket 15 is placed to cover the optical fibers 13 entirely along the longitudinal direction of the optical fibers 13 exposed from the jacket holding section 31e of the integral joint 31 or the integral joint 31. As the jacket 15 is fixed to the jacket holding section 31e by a plurality of projections 31f formed in the jacket holding section 31e, it is possible to fix the jacket 15 efficiently without any increase in number of components. The outer diameter of the jacket holding section 31e with the jacket 15 installed thereon is almost equal to the outer diameter of the cylindrical section 31g.

Finally, the metal member 16 is installed on the jacket holding section 31e of the integral joint 31 to ensure fixation of the jacket 15. Through these steps described above, the optical connector 30 illustrated in FIG. 12A to 13 is able to be assembled.

As described up to this point, according to the optical connector 30 according to the third embodiment, it is possible to assemble the optical connector 30 with a plurality of optical collimators 10a mounted thereon, which is capable of large-capacity communications with reduced number of components, thereby achieving simplified manufacturing process and reduction in cost.

Fourth Embodiment

Figure 14A:
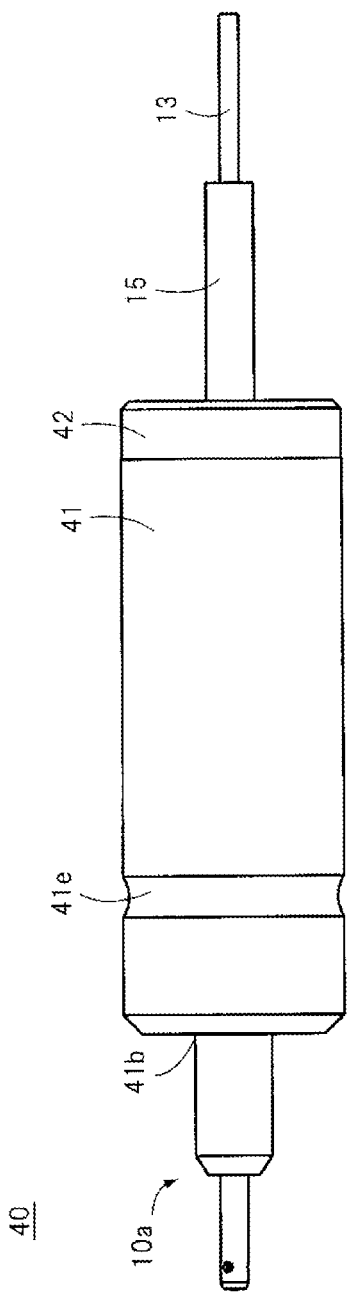
FIG. 14A is a plane view of an optical connector according to a fourth embodiment.
Figure 14B:
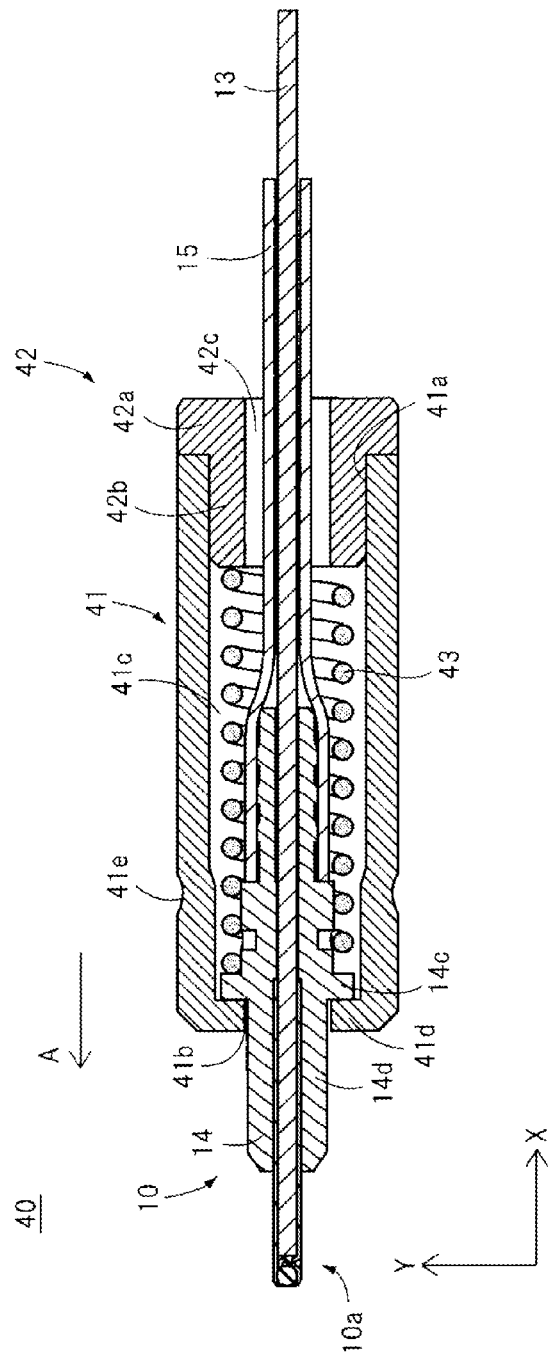
FIG. 14B is a cross sectional view of the optical connector according to the fourth embodiment.

An optical connector according to the fourth embodiment is such that a housing is installed on the optical connector 10 according to the first embodiment. The following description is made about the structure of the optical connector according to the fourth embodiment, with reference to FIGS. 14A and 14B. FIG. 14A is a plane view of the optical connector 40 according to the fourth embodiment and FIG. 14B is a cross sectional view of the optical connector 40. In FIG. 14, the parts corresponding to those of the optical connector 10 according to the first embodiment are denoted by the like reference numerals and their explanation is omitted here.

As illustrated in FIGS. 14A and 14B, the optical connector 40 is configured to have the optical connector 10 according to the first embodiment installed in the housing 41. In other words, the optical connector 40 according to the present embodiment has a housing 41 and a spring 43. The housing 41 has an insertion area 41c for inserting the optical connector 10 so as to expose the resin joint 14 in the optical connector 10 according to the first embodiment and the spring 43 applies a force for biasing the optical connector 10 in the insertion direction of the optical connector 10 relative to the housing 41.

The housing 41 has an almost cylindrical-shaped body and has an insertion hole 41a formed at an end for inserting the optical connector 10. At the other end of the housing 41, an opening 41b is formed for making a part of the resin joint 14 of the optical connector 10 pass therethrough. That is, in the housing 41, the insertion area 41c is formed from the insertion hole 41a to the opening 41b for inserting the optical connector 10 partially. In the housing 41, an annular part that forms the opening 41b and extends inward from the body is called a stopper 41d. As the stopper 41d extends from the body to the inside, the inner circumference of the opening 41b is configured to be smaller than the inner circumference of the insertion area 41c. The optical connector 10 is inserted from the insertion hole 41a up to the place where the collar portion 14c of the resin joint 14 abuts against the stopper 41d. The direction where the optical connector 10 is inserted is called an insertion direction of the optical connector (the direction of the arrow A in the figure). That is, the insertion hole 41a in the housing 41 is provided at the rear side in the insertion area 41c, and the opening 41b is provided at the front side in the insertion direction in the insertion area 41c. In the vicinity of the opening 41b of the housing 41, a groove-shaped engaged portion 41e is formed. When the optical connector 40 is built in a device, the engaged portion 41e engages with an engaging portion provided at the device side. With this engagement, it is possible to position the optical connector 40 inserted into the device and to assure fixation of the optical connector 40 to the device, while preventing displacement of the optical connector and the device.

The inner diameter of the insertion area 41c is configured to be almost equal to the inner diameter of the insertion hole 41a and slightly larger than the outer diameter of the collar portion 14c formed in the resin joint 14. Therefore, between the collar portion 14c and the inner wall of the housing 41, there is formed a small gap. Besides, the inner diameter of the opening 41b is configured to be slightly larger than the outer diameter of the first cylindrical section 14d of the resin joint 14. Therefore, between the first cylindrical section 14d of the resin joint 14 and the inner circumference of the stopper 41d, there is formed a small gap. With this structure, the resin joint 14 is able to move slightly relative to the opening 41b of the housing 41.

In the insertion hole 41a of the housing 41, a cap member 42 is inserted. The cap member 42 is formed of a flange portion 42a and a projection 42b. The outer diameter of the flange portion 42a is configured to be approximately equal to the outer diameter of the housing 41. The outer diameter of the projection 42b is configured to be approximately equal to the inner diameter of the insertion area 41c. And, at the center position of the cap member 42, there is formed a through hole 42c. In the through hole 42c, the jacket 15 covering the optical fiber 13 in the optical connector 10 is inserted. The inner diameter of the through hole 42c is configured to be greater than the outer diameter of the jacket 15. Therefore, between the jacket 15 inserted into the through hole 42c and the through hole 42c, there is formed a gap for facilitating insertion of the jacket 15.

In the insertion area 41c of the housing 41, a spring 43 is inserted in addition to the optical connector 10. The spring diameter of the spring 43 is set to be greater than the outer circumference of the optical connector 10. Accordingly, the spring 43 is positioned between the optical connector 10 and the inner wall of the housing 41 inside the insertion area 41c.

The spring 43 is, for example, a coil spring. The spring 43 is accommodated between the collar portion 14c of the resin joint 14 and the projection 42b of the cap member 42 and is compressed. In other words, the spring 43 is placed compressed between the collar portion 14c of the resin joint 14 and the projection 42b of the cap member 42 and operates to bias the resin joint 14 toward the stopper 41d.

The optical connector 40 is assembled by after inserting the optical connector 10 into the housing 41, fitting the spring 43 in the insertion area 41c and then, pressure-inserting, into the opening 41a, the projection 42b of the cap member 42 with the optical fiber 13 passing through the through hole 42c. At this time, as the cap member 42 is inserted, the spring 43 is deformed elastically, and the spring 43 is compressed.

In the optical connector 40, there is formed a small gap between the first cylindrical section 14d of the resin joint 14 and the inner circumference of the stopper 41d. And, there is also formed a small gap between the collar portion 14c and the inner wall surface of the housing 41. Further, there is a gap between the jacket 15 inserted into the through hole 42c and the through hole 42c. That is, in the optical connector 40, as the gaps are created between the optical connector 10, the housing 41 and the cap member 42, the optical connector 10 is not fixed and the optical connector 10 fit in the housing 41 is movable into the direction Y within a predetermined range (transversal direction of the optical connector 10).

Figure 15:
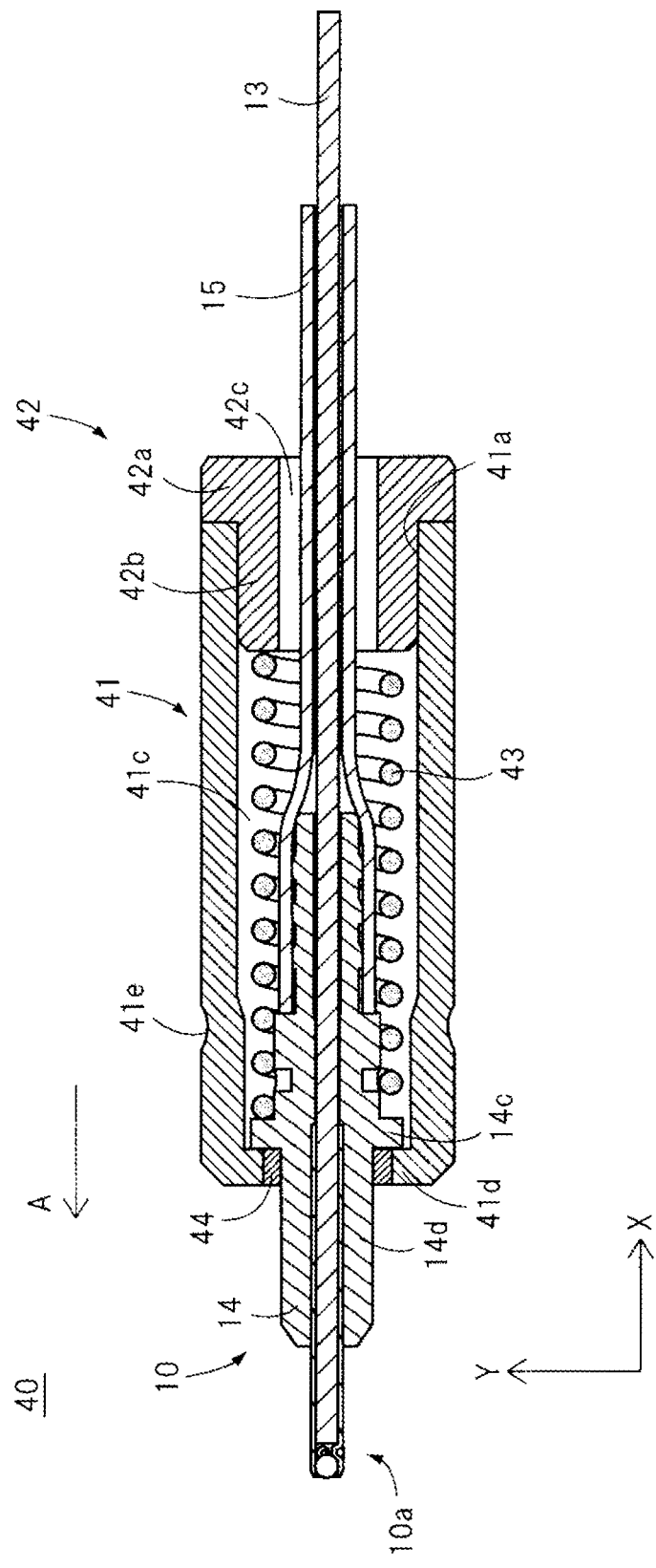
FIG. 15 is a cross sectional view illustrating another structure of the optical connector according to the fourth embodiment.

Here, the optical connector 40 is not limited to the above-described structure and there is no restriction on the structure of the housing 41 to place the resin joint 14 therein, as far as the optical connector 10 mounted in the housing 41 is movable in the direction Y within a predetermined range. FIG. 15 is a cross sectional view illustrating another structure of the optical connector 40. As illustrated in FIG. 15, the optical connector 40 may be configured to have an elastic member 44 such as an O ring between the stopper 41d and the resin joint 14. In this case, the first cylindrical section 14d of the resin joint 14 is in contact with the inner circumferential portion of the elastic member 44 thereby to prevent any space from being created. With this structure, as the elastic member 44 has elasticity, the resin joint 14 is not fixed to the housing 41 and is movable, and the optical connector 10 placed in the housing 41 is configured to be movable in the direction Y within a predetermined range.

Further, the spring 43 is arranged as being compressed by the collar portion 14c and the cap member 42. As the optical connector 10 is not fixed to the housing 41, when a part of the optical connector 10 exposed from the opening 41b of the housing 41 is pushed into the housing 41, the spring is elastically deformed in accordance with the movement of the collar portion 14c. That is, the optical connector 10 placed in the housing 41 is configured to be movable in the direction X (shown in the figure) (longitudinal direction of the optical connector 10) within a predetermined range.

A device where to mount the optical connector 40 has an opening for inserting the optical connector 40 and an optical element (e.g., photodiode) for performing transmission and reception of optical signals with the optical collimator inside the device. However, the device is not limited to this structure and may be modified appropriately.

The opening of the device is designed to have such a size that the housing 41 of the optical connector 40 is inserted into the opening. However, the opening of the device is not limited to this structure, and there is no particular restriction on the opening of the device as far as the resin joint 14 placed in the housing 41 can be inserted into the opening. When the optical connector 40 is inserted via the opening of the device in the insertion direction, the engaged portion 41e of the housing 41 engages with an engaging portion of the device, and then, the optical connector 10 placed in the housing 41 is positioned in the directions of X and Y thereby to make the optical connector 10 fixed. In other words, the position of the optical connector 10 placed in the housing 41 in the directions of X and Y is not fixed and is free until the engaged portion 41e of the housing 41 engages with the engaging portion of the device. The optical connector 10 placed in the housing 41 is configured to be movable in the directions of X and Y within a predetermined range. Even if the optical connector 10 is inserted with the optical element in the device and the optical collimator 10a displaced from each other as to the shaft center, the optical connector 10 is moved by an amount of displacement (slightly moved in the directions X and Y) during the insertion process and is positioned so that the displacement as to the shaft center of the optical collimator 10a can be absorbed.

As described up to this point, in the optical connector 40 according to the fourth embodiment, the optical connector 10 placed in the housing 41 is configured to be movable in the directions X and Y within a predetermined range. Therefore, it is possible to absorb displacement of the shaft centers of the device and the optical connector 10 when they are connected to each other, and thereby to be able to position the collimator lens and the optical fiber with high accuracy without need to do complicated alignment.

The present invention is not limited to the above-described embodiments and may be modified in various forms. In the above-described embodiments, the sizes and shapes illustrated in the accompanying drawings are not intended for limiting the present invention, and may be modified appropriately as far as the effect of the present invention can be exerted. Other modifications may be also possible without departing from the scope of the purpose of the present invention.

In the above-described embodiments, the plastic optical fiber is taken as an example of the optical fiber 13. However, the optical fiber 13 applied to the optical connectors 10 (20, 30, 40) in the above-mentioned embodiments is not limited to the plastic optical fiber. For example, it may be a glass fiber.

Besides, in the above-described fourth embodiment, when a part of the cap member 42 is inserted into the housing 41, an end of the spring 43 is caught and deformed elastically so that the spring 43 is compressed. However, the structure for catching the spring 43 in the housing 41 is not limited to this but may be modified appropriately. For example, a projection may be formed in the insertion area 41c of the housing 41 to catch an end of the spring 43 or a separate member may be pressure-inserted into the insertion area 41c to catch an end of the spring 43.

Further, in the above-described fourth embodiment, the optical connector 40 is configured to have the spring 43, which is used to bias the optical connector 10 in the insertion direction. However, the structure for biasing the optical connector 10 in the insertion direction is not limited to this but may be modified appropriately. For example, as illustrated in FIG. 16A, the cap member 42 and the spring 43 may be replaced with an elastic member 44, such as an O ring, provided between the stopper 41d and the resin joint 14, and the inner wall surface of this elastic member 44 (right side surface shown in FIG. 16A) and the collar portion 14c of the resin joint 14 may be fixed to each other by any adhesive agent. Further, as illustrated in FIG. 16B, it may be configured that the elastic member 44 is provided outside the hosing 41, the resin joint 14 is arranged in such a manner as to place the collar portion 14c outside the housing 41, and the collar portion 14c of the resin joint 14 and the outer wall surface of the housing 41 are adhered or fixed to each other by both side surfaces of the elastic member 44 (left and right side surfaces shown in FIG. 16B). In any of these modified structures, the optical connector 10 can be applied with a force in the insertion direction in accordance with restitution power to the initial state in the elastic member 44.

The disclosure of Japanese Patent Applications No. 2011-117961, filed on May 26, 2011, and No. 2011-205289, filed on Sep. 20, 2011, including the specification, drawings, and abstract, is incorporated herein by reference in its entirety.

The invention claimed is:

1. An optical connector comprising:
a holding member configured to have an accommodating portion formed at an end thereof for accommodating a collimator lens and have an insertion hole formed at an opposite end thereof for inserting an optical fiber; and
a resin joint configured to have a first insertion hole formed at an end thereof for inserting the holding member and have a second insertion hole formed at an opposite end thereof for inserting the optical fiber,
wherein the holding member includes a recess formed in an outer peripheral surface of the holding member near the accommodating portion, the recess forming abutment surfaces to position the collimator lens and the optical fiber by making both of the collimator lens and an end surface of the optical fiber abut against the abutment surfaces, and
the resin joint has a fixing portion formed therein for fixing a part of the optical fiber positioned in the holding member inserted via the first insertion hole into the resin joint, the part being exposed from the holding member.

2. The optical connector of claim 1, wherein the resin joint has a positioning portion configured to position the end of an insertion hole side of the holding member and the optical fiber is fixed to a position near the positioning portion.

3. The optical connector of claim 1, wherein the fixing portion comprises a plurality of fixing portions concyclically formed on the resin joint.

4. The optical connector of claim 1, wherein a plurality of annular projections are formed spaced from each other on an outer circumferential surface of the resin joint for holding a jacket to protect the optical fiber.

5. The optical connector of claim 1, wherein an engaged portion is formed on an outer circumferential surface of the resin joint and the engaged portion engages with an engaging portion of a device when the optical connector is connected to the device.

6. The optical connector of claim 1, wherein a collar portion is formed annularly projecting on an outer circumferential surface of the resin joint for allowing the optical connector to be inserted into a device up to a connection point.

7. The optical connector of claim 6, wherein the optical connector comprises a plurality of optical connectors and the optical connectors are arranged in parallel with each other in a housing having a plurality of through holes formed therein, each of the through holes having an insertion hole of same diameter as an outer diameter of the collar portion and an opening of smaller diameter than the outer diameter of the collar portion.

8. The optical connector of claim 1, further comprising:
a housing configured to have an insertion area for accommodating the optical connector in such a manner that the resin joint of the optical connector is exposed; and
a spring configured to apply a force to move the optical connector relative to the housing in an insertion direction of the optical connector.

9. The optical connector of claim 8, wherein the housing has an engaged portion that engages with an engaging portion formed in a device when the optical connector is mounted in the device.

10. The optical connector of claim 8, wherein the housing has a stopper formed extending inward on an opening of a front side in the insertion direction in the insertion area and the stopper abuts against the collar portion of the resin joint when the optical connector is inserted into the housing.

11. The optical connector of claim 8, wherein a space is created between an outer circumferential surface of the resin joint and an inner circumferential surface of the stopper.

12. The optical connector of claim 8, wherein an elastic member is arranged between an outer circumferential surface of the resin joint and an inner circumferential surface of the stopper.

13. The optical connector of claim 8, wherein a space is created between an outer circumferential surface of the collar portion and an inner wall surface of the housing.

14. An optical connector comprising:
n holding members (n is an integer equal to or greater than 2) each configured to have an accommodating portion formed at an end thereof for accommodating a collimator lens and have an insertion hole formed at an opposite end thereof for inserting an optical fiber of n optical fibers; and
a resin joint configured to have n first insertion holes formed at an end thereof for inserting the holding members, respectively, and have n second insertion holes formed at an opposite end thereof for inserting the optical fibers, respectively,
wherein the n holding members respectively include a recess formed in an outer peripheral surface of the holding member near the accommodating portion, the recess forming abutment surfaces to position the collimator lens and the optical fiber by making both of the collimator lens and an end surface of the optical fiber abut against the abutment surfaces, and
the resin joint has fixing portions formed therein for fixing respective parts of the optical fibers positioned in the holding members inserted via the first insertion holes into the resin joint, the parts being exposed from the respective holding members.

15. The optical connector of claim 1, wherein the optical fiber is a plastic optical fiber.

* * * * *